Aug. 12, 1969   M. W. PETERSON   3,460,720
HILLDROP PLANTER
Filed March 28, 1967

INVENTOR.
MERTON W. PETERSON
BY Tweedale & Gerhardt
ATTORNEYS.

United States Patent Office 3,460,720
Patented Aug. 12, 1969

3,460,720
HILLDROP PLANTER
Merton W. Peterson, Dearborn, Mich., assignor to Massey-Ferguson Inc., Detroit, Mich.
Filed Mar. 28, 1967, Ser. No. 626,584
Int. Cl. G01f *11/10*
U.S. Cl. 222—367                    4 Claims

ABSTRACT OF THE DISCLOSURE

A hilldrop planting assembly including a dispensing passage for receiving seeds from dispensing mechanism on the seed hopper and means for collecting and maintaining seeds in a group for discharge into a furrow. The seeds are collected into a group from the dispensing passage by a collecting valve. A seed wheel having projecting lobes sweeps the group from the collecting valve through a discharge passage, and a discharge valve, also operated by the seed wheel lobes, prevents separation of the group prior to discharge.

Summary of the invention

The present invention is concerned with collecting a group or "hill" of seeds and preventing separation or scattering of the seeds as they are released from the planter into a furrow.

In accordance with the invention, the seeds are collected into a group of selected number by a collecting valve biased to engage a seed wheel. The seeds are swept from the collecting valve by a lobe or tooth projecting from the seed wheel and are carried thereby through a discharge passage and released onto the ground. Preferably, a discharge valve, similar to the collecting valve, is mounted adjacent the outlet of the discharge passage to prevent separation of the group of seeds just prior to discharge.

Brief description of the drawings

In FIG. 1, reference numeral 2 designates collectively a planter connected to links 4 and 6 and including a vertical frame member 8. Carried at the lower end of the frame member 8 is a furrow opener 10 of the curved runner type, and a conventional press wheel 12 is trailingly connected with the planter.

Figure 1:
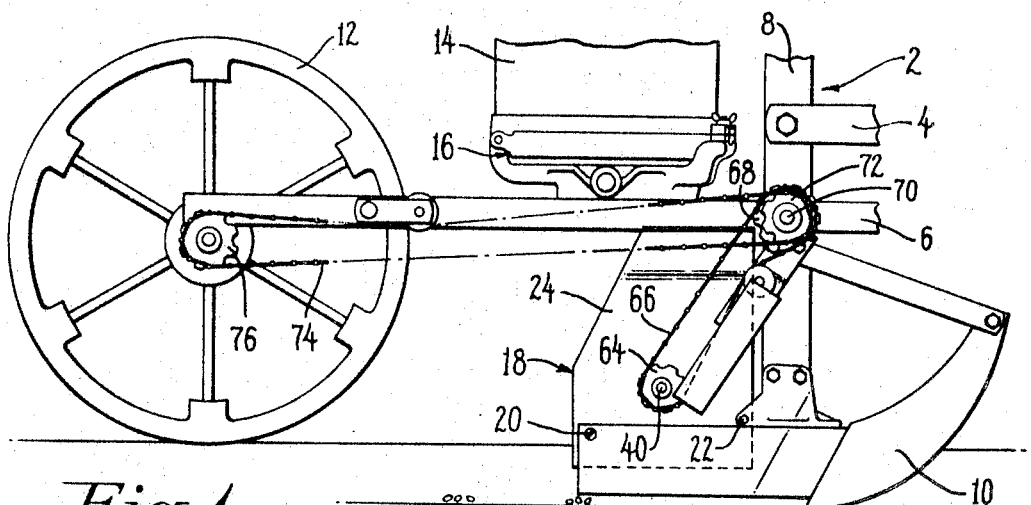
FIG. 1 is an elevational view of a planter having a hilldrop mechanism embodying the invention.
Figure 2:
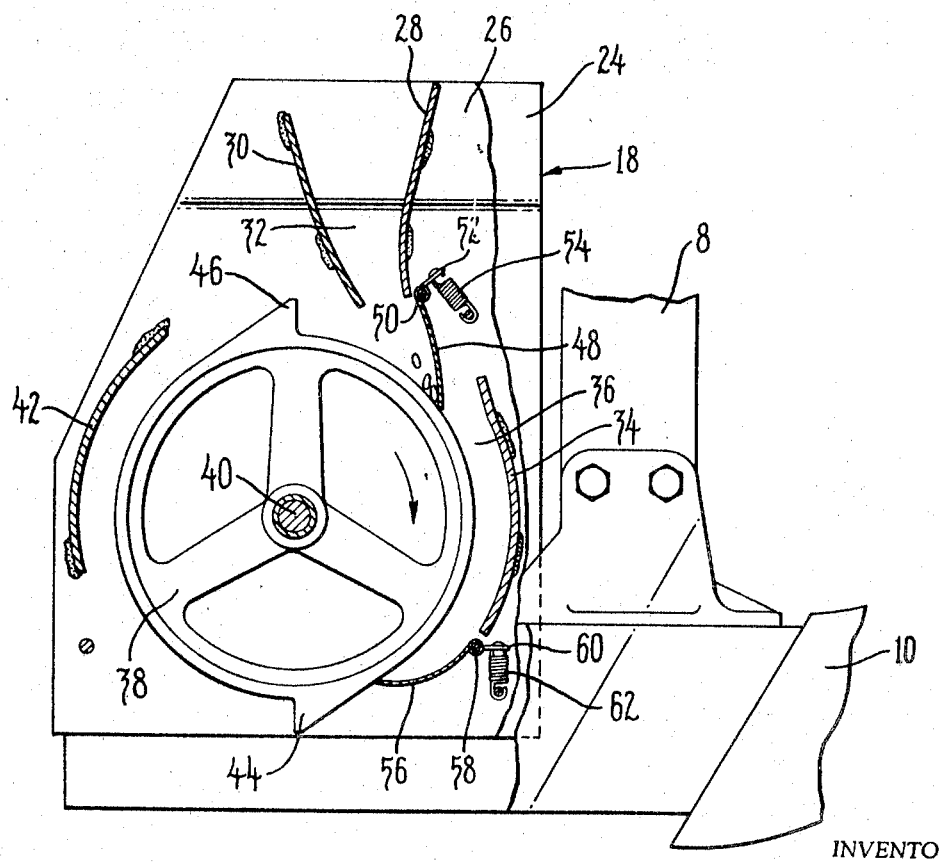
FIG. 2 is an enlarged elevational view of the hilldrop dispensing mechanism.

Frame member 6 supports a seed hopper 14 having a dispensing mechanism 16 which may be of the type shown in U.S. Patent No. 2,685,988, the entire disclosure of which is incorporated herein by reference. It should be understood, however, that the mechanism for dispensing seeds from hopper 14 may be of any well known type and is not limited to any particular type of dispensing mechanism.

Carried beneath the dispensing mechanism 16 is a hilldrop assembly 18 secured to the furrow opener 10 and frame member 8 by bolts 20 and 22, respectively. The hilldrop assembly 18 includes a pair of side plates 24, 26 held in spaced relationship by curved plates 28, 30, 34 and 42. Plates 28 and 30 cooperate with the side plates to form a dispensing passage 32, the inlet end of which communicates with the outlet of the dispensing mechanism 16 to receive seeds from the hopper. Plate 34 cooperates with a dispensing wheel 38 to define a discharge passage 36. The inlet end of discharge passage 36 is located below the outlet end of the dispensing passage 32. Dispensing wheel 38 is rotatably mounted on a horizontal shaft 40 and is formed at its periphery with two radially projecting lobes 44 and 46 each of which cyclically sweep through the discharge passage 36. The curved plate 42 is mounted between plates 24 and 26 on the opposite side of the dispensing wheel 38.

As the seeds are discharged from the dispensing mechanism they fall through the dispensing passage 32 where they are stopped by the periphery of the wheel 38. In the prior art, there is a tendency for the seeds to separate as they move through the discharge passage 36 due to the rebounding and ricocheting action of the seeds. In accordance with the present invention, however, a collecting valve 48 is pivotally mounted on a pin 50 adjacent the outlet end of the dispensing passage 32 and is biased to engage the periphery of the dispensing wheel by a spring 54 engaged with an ear 52 on the collecting valve. As the seeds pass through the outlet of the dispensing passage 32, they are collected into groups (in this case numbering three seeds) by the collecting valve.

In the illustrated embodiment, the dispensing mechanism and the dispensing wheel 38 are driven at relative speeds such that three seeds drop through passage 32 with each one-half revolution of the dispensing wheel 38. The seeds are then thus collected into the selected group before they enter the discharge passage 36. After the seeds have been collected into a group by the collecting valve 48, the lobe on the seed dispensing wheel 38 carries the seeds through the discharge passage 36. A discharge valve 56 prevents the seeds from becoming separated, and the lobes sweep the seeds from valve 56 and discharge them onto the ground. Discharge valve 56 is pivotally mounted on a pin 58 at the outlet end of the discharge passage and is biased into engagement with a periphery of the wheel by a spring 62 connected with an ear 60 formed on the discharge valve 56. The seeds are thus removed first from the collecting valve 48 by one of the lobes 44, 46 and fall in a group through passage 36 onto the discharge valve 56 where the same lobe removes them from the discharge valve and causes them to fall onto the ground into a group.

As shown in the illustrated embodiment in FIG. 1, a sprocket 64 is mounted on shaft 40 of the dispensing wheel and is driven by a chain 66 extending around its sprocket 68 mounted on a cross shaft 70. Shaft 70 in turn is driven by a sprocket 72 through a chain 74 trained around a sprocket 76 mounted on the shaft of press wheel 12. As shown in the drawing, the direction of rotation of seed wheel 38 is such that the seeds are swept from valve 56 in the opposite direction of the movement of the planter to reduce or eliminate the relative velocity between the seeds and the ground.

While a specific embodiment of the invention has been illustrated and described, it will be apparent to those skilled in the art that the invention is not limited to the exact construction shown.

I claim:
1. In a planter having seed dispensing mechanism, the combination comprising: a dispensing passage for receiving seeds from the dispensing mechanism, a discharge passage having its inlet end spaced from the outlet of the dispensing passage, a rotatable seed dispensing wheel having at least one radially projecting lobe movable past the outlet end of the dispensing passage and through the discharge passage from the inlet to the outlet thereof, a seed collecting valve pivotally mounted beneath the outlet end of the dispensing passage and biased into engagement with the periphery of the seed dispensing wheel for collecting seeds from the dispensing passage into a group, said lobe cyclically releasing the collecting valve and moving the group of seeds through the discharge passage, and a discharge valve pivotally mounted beneath the outlet end of the discharge passage and biased into engage- ment with the periphery of the seed dispensing wheel to prevent separation of the group of seeds prior to discharge.

2. The construction claimed in claim 1 wherein said seed dispensing wheel has two radially projecting lobes for dispensing two groups of seeds during each revolution.

3. The construction claimed in claim 1 wherein the seed dispensing wheel rotates in a direction such that the lobes discharge the seeds in a direction opposite to the direction of movement of the planter to reduce the relative velocity of the seed groups with respect to the ground.

4. The construction claimed in claim 1 wherein said dispensing wheel has a plurality of radially projecting lobes for dispensing groups of seeds during each revolution.

References Cited

UNITED STATES PATENTS

| | | | |
|---|---|---|---|
| 636,683 | 11/1889 | Moussette | 222—368 X |
| 835,084 | 11/1906 | Tuggle | 222—368 X |
| 2,808,181 | 10/1957 | Oehler | 222—368 |
| 3,182,863 | 5/1965 | Brandt et al. | 222—368 X |

ROBERT B. REEVES, Primary Examiner

FREDERICK R. HANDREN, Assistant Examiner

U.S. Cl. X.R.

222—517